J. H. J. HAINES.
MACHINE FOR RECORDING AND REPRODUCING SOUND.
APPLICATION FILED JUNE 25, 1909.
1,158,917.
Patented Nov. 2, 1915.
6 SHEETS—SHEET 3.
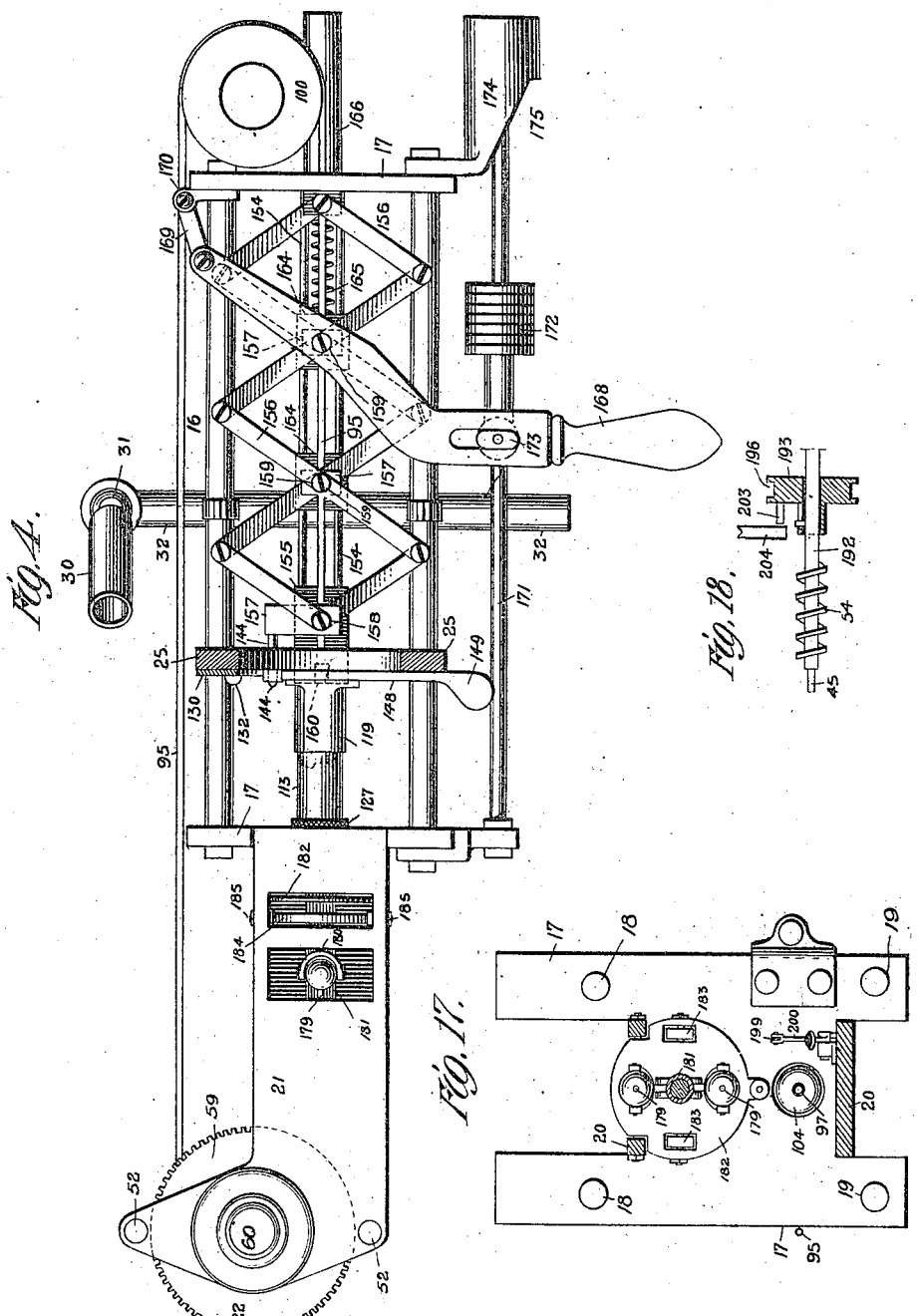

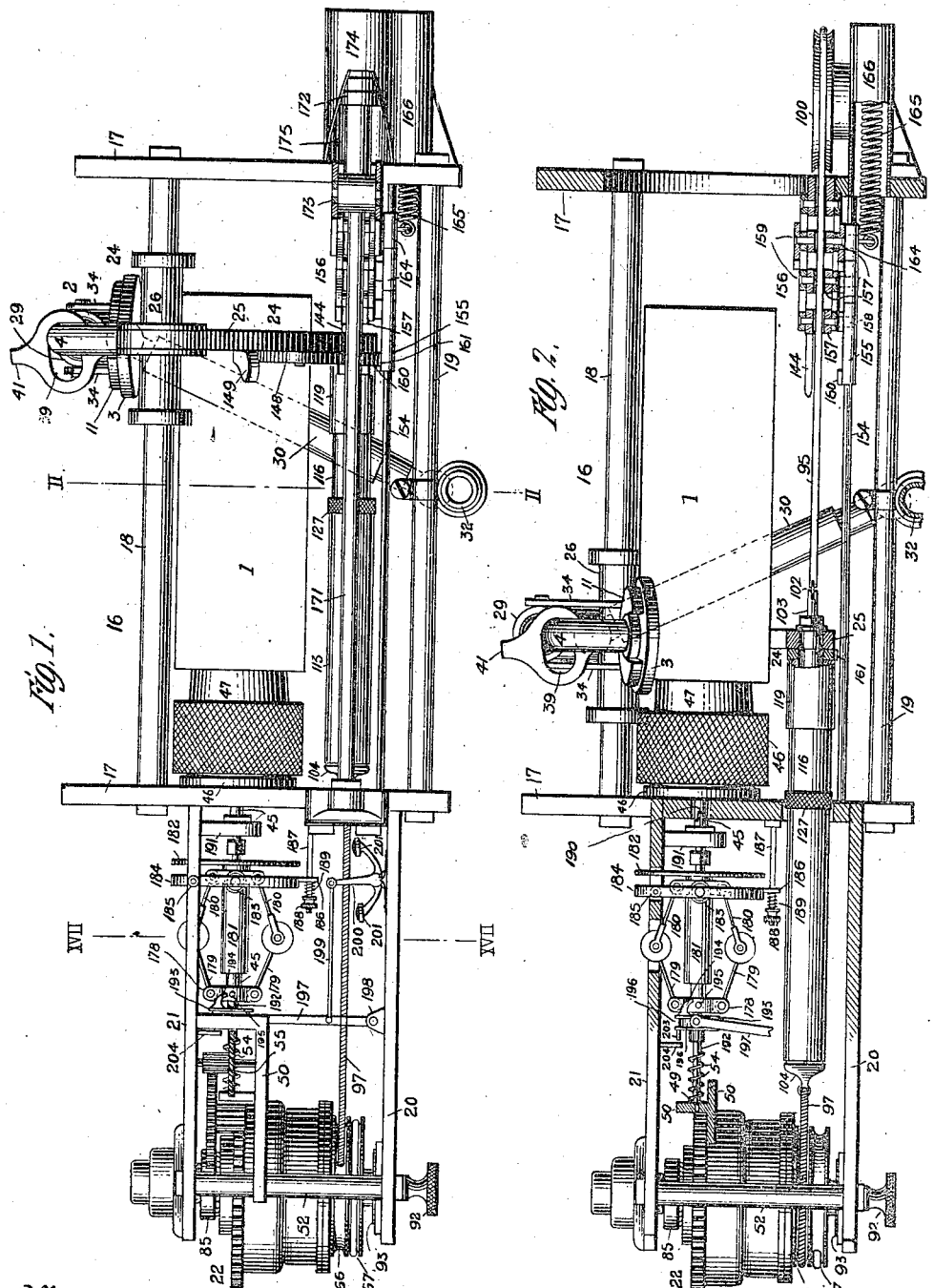

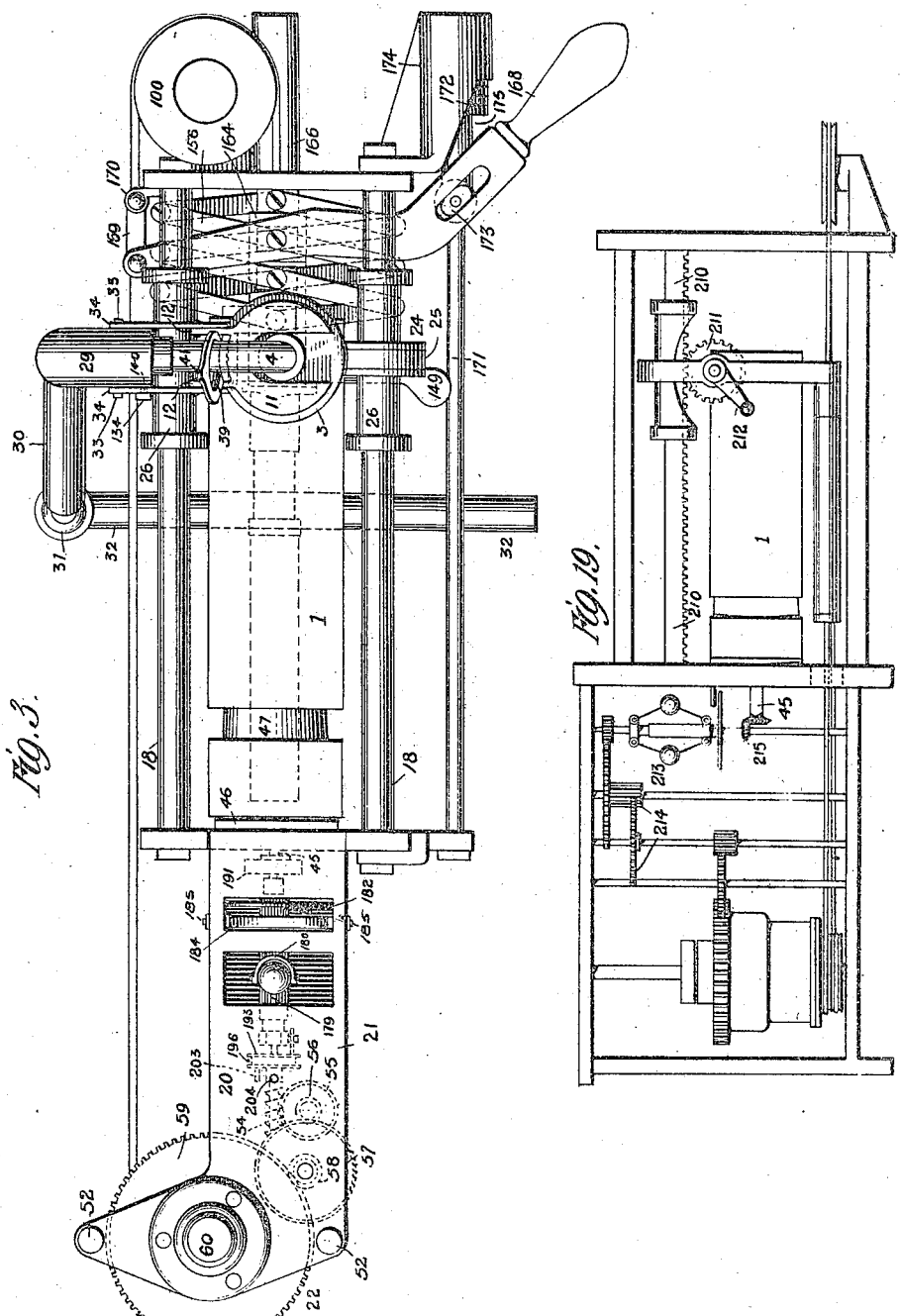

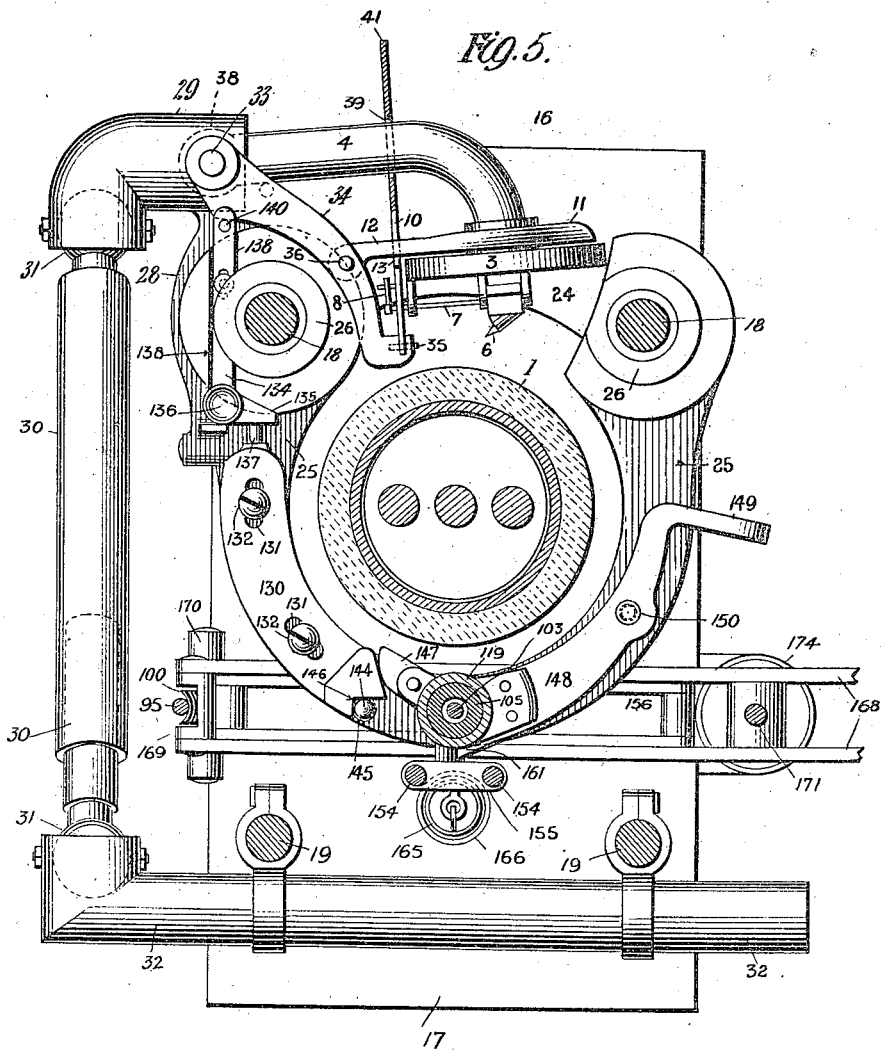

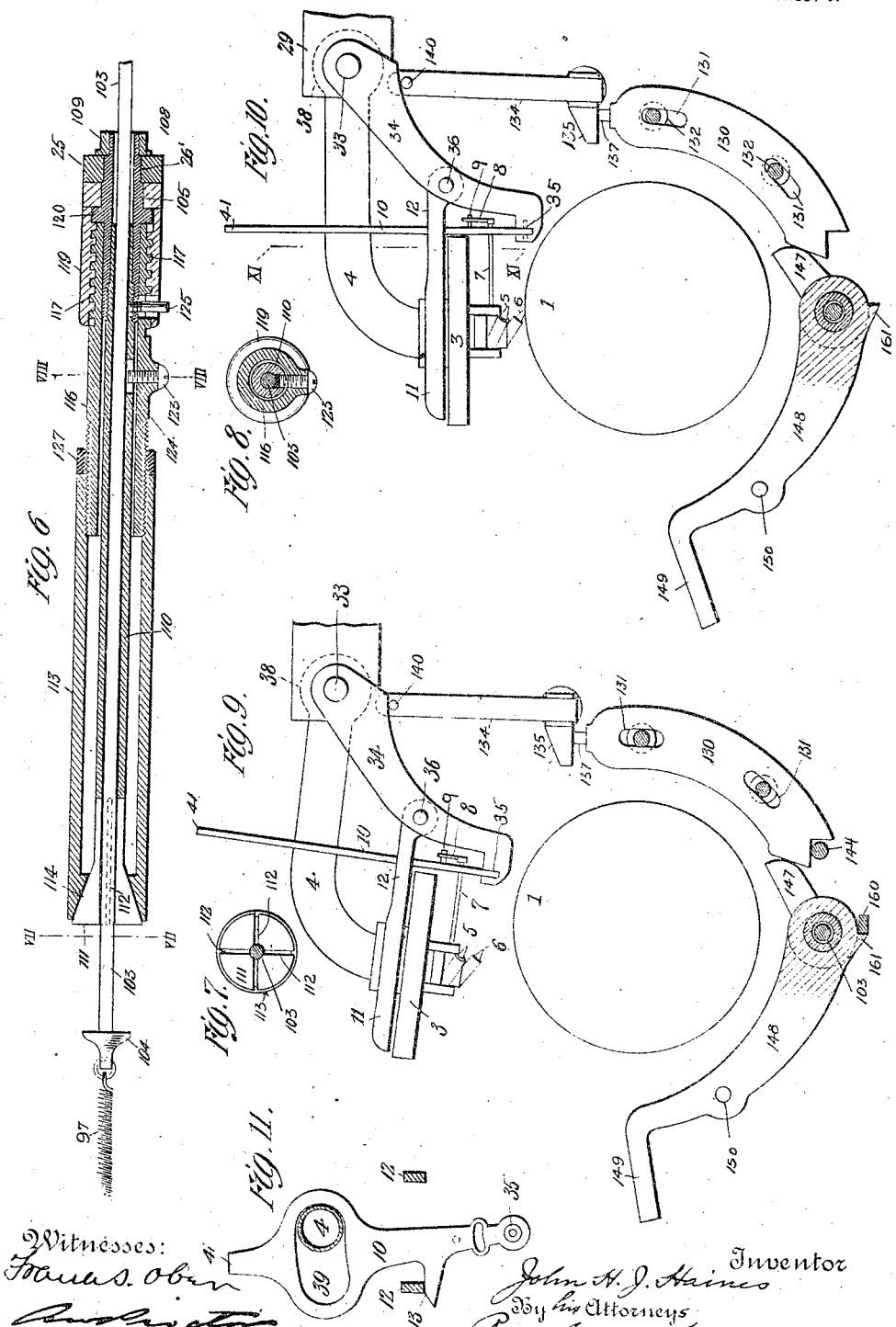

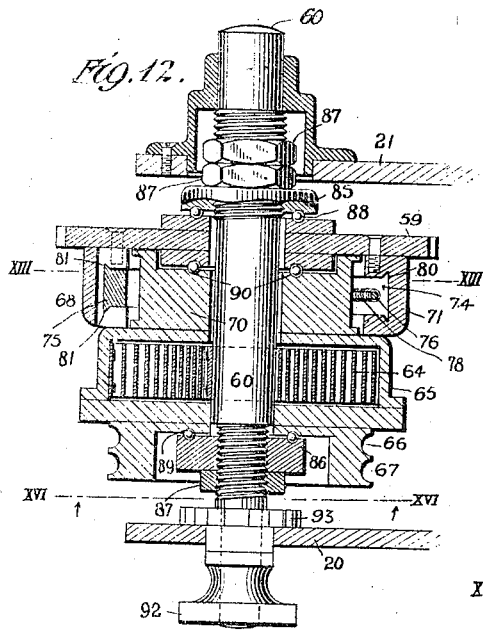
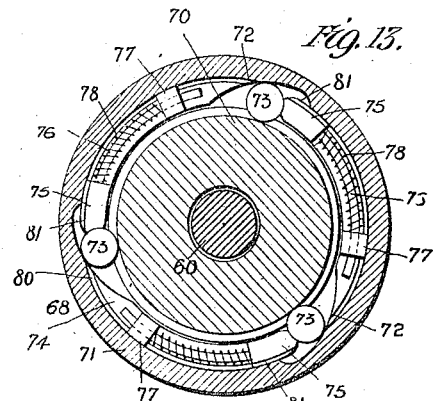
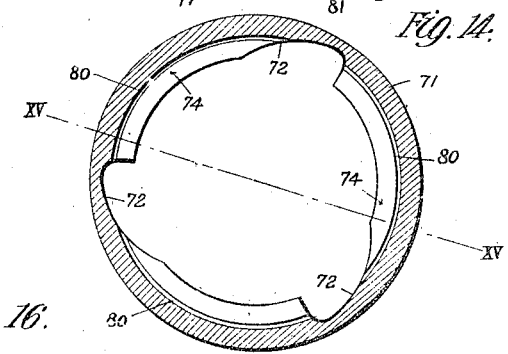
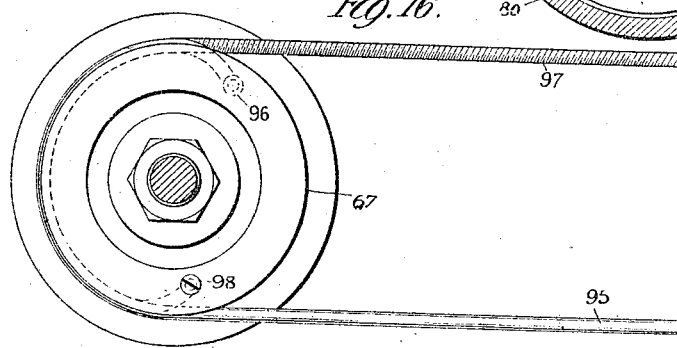
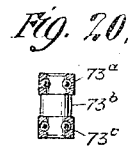
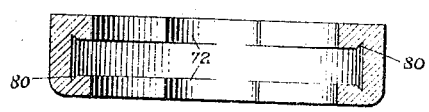

UNITED STATES PATENT OFFICE.

JOHN H. J. HAINES, OF NEW YORK, N. Y.

MACHINE FOR RECORDING AND REPRODUCING SOUND.

1,158,917.  Specification of Letters Patent.  Patented Nov. 2, 1915.

Application filed June 25, 1909. Serial No. 504,247.

*To all whom it may concern:*

Be it known that I, JOHN H. J. HAINES, a citizen of the United States, residing at the city of New York, in the borough of Manhattan and State of New York, have invented certain new and useful Improvements in Machines for Recording and Reproducing Sound, of which the following is a full, clear, and exact description.

This invention relates to sound reproducing apparatus of any sort where a record medium is continuously rotated, and a sound recording or reproducing device is displaced gradually over the surface of the record medium. A spring or other motor has been ordinarily employed for rotating the record medium, and displacing the sound recording or reproducing device.

The essence of the present invention consists in utilizing, for the purpose of storing all the necessary power in the driving spring or motor, the return movements which are necessarily imparted from time to time to the sound recording or reproducing device in repositioning the latter at the commencement of the record.

From another aspect the present invention consists in a mechanism having a spring motor driving one part having a comparatively rapid rotation and another part having a very slow rectilinear displacement, and restoring the power of the spring whenever required by the mere act of returning the rectilinearly displaced part to its initial position.

A second feature of the invention relates to what I term a "releasable grip connection" between a sound recording or reproducing device and the means whereby the movements of such device re-tension the driving motor. The purpose of this "slip connection" is to permit a free movement of the sound recording and reproducing device independently of and without disturbing the driving motor after the latter has been tensioned.

A still further feature or object of the invention is to provide for the foregoing actuations without in any case injuring the record medium by improper relative movements of the sound recording and reproducing device thereon. For this purpose I provide for lifting the sound recording or reproducing device away from the record medium an instant before the same is moved under any circumstances, except in the particular case of its normal gradual movement caused by the operation of the machine in recording or reproducing sound. As will later appear, I also provide a particularly advantageous form of spring motor and a particularly efficient clutch which secures the slip connection above referred to.

Among still further features of the invention are the mechanism which I have shown for returning the sound recording or reproducing device and means for establishing a flexible sound connection therefrom to a stationary sound tube. I also provide a novel form of governor, and a stop motion associated therewith.

With these various and other objects in view my invention consists in the features of construction and combination as hereinafter set forth and claimed.

In the drawings: Figure 1 is a front elevation of a sound reproducing apparatus embodying the principles of my invention. Fig. 2 is a similar view showing the sound recording or reproducing device at the commencement of a record. Fig. 3 is a top or plan view of the same with the parts in the relation shown in Fig. 1. Fig. 4 is a horizontal sectional view. Fig. 5 is a vertical sectional view on the line II—II of Fig. 1, looking in the direction of the arrow. Fig. 6 is a sectional view of the clutch which constitutes what I have referred to as a "slip connection." Fig. 7 is a sectional view on the line VII—VII of Fig. 6 looking in the direction of the arrow; and Fig. 8 is a section on the line VIII—VIII of Fig. 6. Fig. 9 is a partly diagrammatic sectional view showing the sound recording or reproducing device raised away from the record medium. Fig. 10 is a similar view showing the sound recording or reproducing device in place upon the record medium. Fig. 11 is a sectional view on the line XI—XI of Fig. 10. Fig. 12 is a vertical sectional view of the spring motor. Fig. 13 is a section on the line XIII—XIII of Fig. 12. Fig. 14 is a similar view with some of the parts removed. Fig. 15 is a section on the line XV—XV of Fig. 14. Fig. 16 is a section on the line XVI—XVI of Fig. 12 looking in the direction of the arrow. Fig. 17 is a section on the line XVII—XVII of Fig. 1 looking in the direction of the arrow. Fig. 18 is a detail view of part of the driving train including the stop motion therefor. Fig. 19 is a side elevation showing certain modifications. Fig. 20 shows a detail of the spring motor.

Referring to the drawings in which like parts are designated by the same reference sign, 1 denotes a record medium adapted to be continuously rotated, and 2 indicates a recording or reproducing device adapted to have a slow rectilinear displacement over the surface of the record medium 1. In the drawings I have shown an ordinary cylindrical phonographic record 1 and a sound recording and reproducing device 2 of the type which has been made the subject of my pending application No. 462,783. This recording and reproducing device comprises a sound chamber 3 (see Figs. 9 and 10) having a sound tube 4 and a diaphragm which may be operatively connected to either of two stylus points 5, 6, by the simple expedient of oscillating a small crank shaft 7. This crank shaft has a crank arm 8 engaging a pin 9 of a lever 10. 11 denotes a weight which has arms 12 straddling the lever 10 (see Fig. 11) and adapted to be lifted at one position of movement of said lever by the engagement of a shoulder 13 forming part of said lever. These features as thus far described, do not constitute a part of the present invention except in their broadly stated functions of constituting a sound recording or reproducing device.

In accordance with the present invention I provide a main supporting frame 16 of the machine as a whole, and comprising a pair of flat frame plates 17 rigidly joined together by upper and lower pairs of horizontal rods 18 and 19.

20, 21 denote extensions of one of the frame plates 17, which constitute a supplemental frame for the driving motor, broadly denoted 22, and its associated parts. I have shown a spring motor 22, but any arrangement by which power is stored up and subsequently released to rotate the record medium may be employed, or the weight of the carriage itself may be used, assuming that the machine is held in an inclined or vertical position.

24 designates broadly what may be termed a carriage for the sound recording or reproducing device 2, and which is guided on the horizontal frame rods 18. I make this carriage of a generally U-shaped rigid metal part 25 with rigid sleeves 26 surrounding the rods 18 for a sufficient distance of their length to get an adequate bearing surface. In practice I line the sleeves 26 with ball bearing race-ways of any suitable description and which it is not necessary to illustrate. One of the sleeves 26 has a rigid central upwardly projecting web 28 on which is fixed an L-pipe connection 29.

30 denotes a telescoping pair of tubes with ball shaped ends 31, respectively entering the L-pipe connection 29, and a stationary pipe 32 through which the sound is delivered or received.

The pipe connection 29 has trunnions 33 from which the sound recording or reproducing device is hung (see Figs. 9 and 10). For this purpose I prefer to make use of a U-shaped frame or bail 34 pivoted to the trunnions 33, and which may be considered as the supporting frame for all the parts of the sound recording or reproducing device. Under these circumstances the lever 10 already described is pivoted at 35 to the lower end of the bail 34, and the weight 11 is pivoted between the arms of the bail at 36. The sound tube 4 has a globular terminal end 38 within the pipe 29 on an axis concentric with the trunnions 33, and between inwardly projecting portions of which said terminal end 38 is pivoted. With this construction the lever 10 is preferably made with an elongated orifice 39 which incloses the sound tube 4, thereby supporting said tube under certain conditions and limiting the to and fro movement of said lever 10.

41 denotes an upwardly projecting portion of the lever which is shaped to facilitate its convenient manual manipulation.

From the construction as thus far described, it will be clear that the carriage 24 is adapted to slide along the frame rods 18 of the machine, whereby the sound recording or reproducing device 2 is carried along the length of the cylindrical record medium 1. Whenever desired, the sound recording or reproducing device can be lifted away from the record medium 1 by tilting upward the bail 34. Aside from this, the sound recording or reproducing device shown is adapted to be put into condition for its respective functions by merely shifting the handle 41 from one limiting position to the other. This movement oscillates the crank 8 thereby properly positioning the appropriate stylus 5 or 6 with respect to the record medium and to the diaphragm. At the same time the weight 11 is relieved from or applied to the sound box 3 on which it rests, thereby altering the pressure of the stylus on the record medium to this extent.

I will now describe the manner in which I support the record medium and give the latter its rotative movement.

45 denotes a spindle having a bearing in the head 46 forming part of one of the frame plates 17. This bearing 46 should be of ball bearing character adapted to secure as great accuracy of rotative movement as possible with minimum friction. The spindle has a usual cone 47 on which the record medium 1 is slipped and held by the frictional engagement. At its other end the spindle is extended to a pivot bearing 49 in a bracket 50 of the frame plate 21. In order to give sufficient rigidity to this bracket 50, and further strengthen the support of the frame plates 20 and 21, I provide rigid connecting posts 52 joining the frame plates 20, 21, and to one of which the bracket 50 is also attached.

Adjacent to the bracket 50 the spindle 45 has a worm 54 with which meshes a worm gear 55 driven through a multiplying gear train 56, 57, 58, from a large gear wheel 59 which rotates concentrically on an arbor 60 which normally rigidly joins the frame plates 20, 21 at their outer extremities. (See particularly Fig. 12).

The gear 59 forms part of the spring motor 22 previously referred to. This spring motor is of a special character as mentioned in the preliminary part of the specification adapted to be removed or retensioned by the manually actuated movements of the carriage 24. As particularly shown in Fig. 12, my preferred construction of motor includes a main spring 64 fixed at the center to the arbor 60 and at its outer extremity to a drum 65. The drum 65 carries a pair of grooved pulleys 66, 67, and has a clutch connection, broadly denoted 68, with the gear wheel 59. The clutch connection 68 between the drum 65 and the gear wheel 59 is adapted to serve the general purpose of the ratchet clutch which is commonly used in spring motors to permit the rewinding of the main spring without disturbing the driving gear train of the mechanism. In the present instance however I provide a roller clutch of special construction adapted to give great sensitiveness and efficiency of action. Briefly described, the clutch comprises a central hub 70 forming part of the drum 65 and an outer sleeve 71 forming part of the gear 59. The sleeve 71 has interior inclined recesses 72 within which are received rollers 73 adapted to bear against the inclined walls of the recesses 72 and against the periphery of the hub 70. The sleeve 71 has a comparatively deep interior groove 74 which intersects or passes through the recesses 72, and in this groove 74 I provide spring pressed followers 75 which maintain a constant engagement with the rollers 73, tending to press the latter toward the narrow end of their inclined recesses 72. Each follower block 75 has a curved stem 76 passing through an anchorage or abutment block 77 fixed in the groove 74.

78 denotes spiral springs surrounding the stems 76 by which the follower blocks are kept pressed toward the rollers 73.

In order to properly guide the follower blocks 75 in their grooves 74 I make the latter with undercut V-recesses 80 at their sides and provide the follower blocks with corresponding dovetailed enlargements 81 at their bases which fit the undercut recesses 80.

Each of the rolls 73 is preferably made in three sections $73^a$, $73^b$ and $73^c$ (see Fig. 20) independently rotatable on the same axis and together forming a cylindrical outline as shown. Under these circumstances the middle zone or section $73^b$ lies opposite the groove 74 and is engaged by the follower block 75. The outer sections $73^a$ and $73^c$ of the rollers 73 engage the inclined walls of the recesses 72 and are free to turn or roll thereon without hindrance from the engagement of the follower block 75, which as stated, bears only on the middle section.

By virtue of the foregoing construction a very sensitive and efficient clutch is provided between the drum 65 and gear wheel 59.

In order to journal the parts with the necessary antifriction qualities and provide for an easy adjustment, I make both the drum 65 and the gear wheel 59 loose on the arbor 60 and supported exclusively by ball bearings.

85, 85 denote ball bearing race-ways threaded on the arbor 60 and locked in any position of adjustment thereon by the lock nuts 87. The drum 65 and the gear wheel 59 are grooved to form companion race-ways, thereby providing for the ball bearings, respectively denoted 88 and 89. 90 denotes a similar ball bearing connection between the gear wheel 59 and the hub 70 of the drum 65. It is evident that all these ball bearings are simultaneously adjusted by angularly displacing either of the race-ways 85 or 86 on the arbor 60. At the same time a perfect antifriction rotative support is established for both the drum 65 and the gear wheel 59. The arbor 60 has been described as normally fixed or stationary, but this arbor may be turned to any initial setting by a handle 92 and locked there by a ratchet wheel 93 and pawl (not shown). This setting fixes the initial tension of the main spring 64.

From the drum 65 I provide a flexible band, strap, cord, chain or connection 95 which is extended around the groove 67 for about half a circumference and anchored at the point 96. 97 denotes another connection and for which I employ a simple spiral spring and which is passed around the other groove 66 and anchored at the point 98. The flexible connection 95 which I will briefly refer to hereafter as a cord, is extended along the entire length of the machine, passing over a loose pulley 100 at the opposite end thereof, and being returned parallel to the main portion of its length and in as close alinement with the spring 97 as possible. At the point 102 the cord 95 is joined to a rod or stem 103 having a button 104 to which is fixed the spring 97. Surrounding this rod or stem 103 is a tube 105 which moves with and is virtually a part of the carriage 24. There is a clutch connection between the tube 105 and the rod 103 and which I have previously referred to as a releasable grip connection. The function of this mechanism may be broadly defined as permitting a free movement of the carriage 24 under certain circumstances without interfering with the spring motor 22.

The carriage 24 has its U-shaped body 25 perforated at 26' (see Fig. 6) and in this hole or perforation the tube 105 is rigidly fixed by means of a nut 109.

110 denotes an extension of the tube 105 and which has a flaring or conical end 111 with radial slots 112.

113 denotes a sleeve having a taper hole 114 at its outer end corresponding in angle to that of the cone 111 and thereby constituting in effect a collet chuck to grasp the rod 103 under certain circumstances.

116 denotes an extension of the sleeve 113. This latter sleeve 116 has coarse spiral threads 117 adjacent to its inner end which adjoins the carriage 24.

119 denotes an internally threaded collar which I shall term a grip-nut threaded to the sleeve 116 and adapted to displace said sleeve longitudinally when said grip-nut is angularly turned. The grip-nut 119 has a thrust bearing connection with the tube 105 so as to be constrained against any longitudinal movement independently of said tube 105. For this purpose said tube 105 has a flange 120 and the grip-nut 119 has a reduced portion fitting between this flange and the carriage frame 25. The sleeves 113 and 116 are constrained against relative angular movement with respect to the tube 110 by means of a screw 123 passed through one of said sleeves and through a slot 112 of the tube 110.

125 denotes a screw for fixing the adjustment of tubes 105 and 110 with respect to one another, these tubes being threaded together to permit an initial adjustment. This screw 125 projects through a large opening in the surrounding sleeve 116 and also in the outside grip-nut 119 in order not to interfere with the movement of these parts. The sleeves 113 and 116 are also threaded together to permit initial adjustment, and may be locked in any desired relation by a lock nut 127.

By virtue of the foregoing construction the jaws formed by the slotted cone 111 grasp the rod 103 when the grip-nut 119 is turned so as to impel the sleeve 113 longitudinally to the left with respect to its containing tube 110. In the normal condition of the apparatus the rod 103 is tightly grasped in this manner and this connection is only loosened under certain circumstances when the carriage is being slid back and forth freely with the sound recording or reproducing device removed from the record surface, as and for purposes later described.

I provide automatic means for elevating the sound recording or reproducing device away from the record surface whenever the carriage is moved except in the case of its normal use for sound recording or reproducing. 130 is a slider of arcuate outline having slots 131 in the general direction of the curvature of the part 130 and which also corresponds to the curvature of the lower depending portion 25 of the carriage. 132 denote screws which are passed loosely through the slots 131 and are fixed in the material of the carriage frame 25 thereby serving as guides for the slider 130, permitting the latter to have a limited arcuate movement. This movement is generally concentric with the axis of rotation of the record medium 1. 134 is a link to the lower end of which is adjustably fixed a block 135 the position of which can be altered by manipulating a set screw 136. 137 is a pin on this block and which abuts against the upper end of the slider 130. The link 134 is guided in a recess 138 of one of the sleeves 26 of the carriage and has at its upper end a pin 140 abutting against the underside of the bail 34 of the sound recording or reproducing device. It will be seen that when the slider 130 moves upwardly that the movement is transmitted to the link 134 and the bail 34, thereby elevating the sound recording or reproducing device. At its lower end the slider 130 is adapted to be engaged by two separate means for causing the foregoing movement. One of these means comprises a pin 144 which has a tapering or conical end and which passes through an opening 145 in the carriage frame 25 and engages behind the lower end of the slider 130, the latter having a V-recess 146 at this point to facilitate the engagement. The lower end of the slider 130 is also adapted to be engaged by a toe 147 rigidly attached to and forming part of the grip-nut 119 (previously described). This same grip-nut has a lever arm extension or handle 148 terminating in a bent-over extremity 149 adapted to be conveniently manipulated by hand. 150 denotes a detent which holds the lever 148 in either of its extreme positions, corresponding respectively to the gripped or loosened relation of the collet 111. It may be noted that when the handle 149 is elevated in Fig. 5, the collet 111 is loosened and at the same time the sound recording or reproducing device 2 is elevated off of the record medium. Conversely the depression of handle 149 tightens the collet 111 and permits the lowering of the sound recording or reproducing device upon the record medium, unless said device is still held up by the taper pin 144.

I have referred to the taper pin 144 which is adapted to be passed through an opening 145 in the carriage frame under certain circumstances. This pin forms part of a mechanism for returning the carriage to its initial or starting position, or to any other position on the record medium. I provide a mechanism adapted to be projected against the carriage, and then withdrawn, so as not to interfere with the subsequent free movement of the carriage. 154 denote rods extending along the length of the machine parallel with one another and with the main frame rods 18 and 19, these rods extending centrally beneath the path of movement of the carriage as shown in Fig. 5. 155 is a block slidable on the rods 154 and to which is connected one end of a lazy-tong system 156. The latter also has smaller blocks 157 at the various central pivot joints between the links, these latter blocks being perforated along the path of the cord 95 previously described and through which said cord passes. The outer of the perforated blocks 157 may be considered as part of the block 155, the two moving together and being preferably fixedly joined together by the connecting pivot pin 158. 160 is a cam or dog on the block 155 and which engages behind a ledge 161 of the lever 148 when the block 155 is fully projected against the carriage 24. The result of this action is to lift the lever 148, thereby releasing the collet 111 in the manner already described. But the taper pin 144 is fixed to the outer block 157 and inasmuch as the latter is rigidly fixed to the block 155, the taper pin 144 has been necessarily first projected through the hole 145 of the carriage against the slider 130, thereby lifting the sound recording or reproducing device away from the record. Conversely when the carriage return mechanism is withdrawn, the taper pin 144 leaves its engagement later than the cam 160, thereby insuring the gripping of the collet before the sound recording or reproducing device is dropped again on the record. In order to steady the movement of the lazy-tongs 166, I provide additional blocks 164 at the location of the other pivot joints 159, the latter blocks being also guided on the rods 154. The inner block 164 has a tensile spring 165 secured thereto which is secured at its other end in a tube 166 at the end of the machine. This keeps the lazy-tongs normally retracted, in the position shown in Figs. 1 and 2. 168 denotes an operating handle or lever having a link connection 169 with the frame of the machine 170. This lever is pivoted to the lazy-tongs at the location of the inner pivot pin 159, whereby the lazy-tongs are projected and retracted under the swinging movements of the lever handle. 171 denotes a stationary rod on which is sleeved a plunger 172 having a pin and slot connection 173 with the operating lever 168. 174 denotes a dash-pot or cylinder partly cut-away on one side 175 into which the plunger 172 is projected at one limit of movement of the operating lever 168. This evidently cushions the retraction of the carriage return mechanism after the latter has been projected to move the sound recording or reproducing device on the record medium.

From the foregoing it will be understood that swinging the handle 168 to the left in Fig. 4, first lifts the recording or reproducing device off the record medium and then loosens the collet clutch 111. The carriage 24 with its sound recording or reproducing device is then moved toward its initial or starting position to any point desired. If the spring motor 22 is not fully wound at this time, and the return of the carriage is continued far enough, it will happen sooner or later that the collet 111 engages the button 104, and thereafter the movement of the carriage effects a rewinding of the spring motor. This is done on account of the pull which is imparted to the cord 95. This cord, being carried around the pulley 67, causes a displacement of the drum 65 in a direction to tension the spring 64. At this time the ball clutch 68 between the drum 65 and the gear wheel 69 obviously slips. As long as the collet 111 is out of contact with the button 104, this rewinding does not occur, but the carriage merely slides idly back and forth without effect on the spring motor. It will therefore be evident that the carriage can be placed at any point desired at any time and under any circumstances whatever, and it will not be placed in any case in any position where the motor has not been sufficiently wound or tensioned to operate the mechanism to the completion of the entire record, if this is desired.

The remaining features of the invention are more or less incidental and relate to the governor, the stop motion therefor and certain other minor matters. The governor which I employ includes a collar 178 loose on the spindle 45 but constrained against longitudinal movement, and having the usual pivoted weighted arms 179, with link connections 180 to a sliding sleeve 181.

182 denotes a disk forming part of the sliding sleeve 181 and which is adapted to be displaced into contact with rollers 183 of a non-rotatable frame 184, which may be considered as stationary with respect to the disk 182. A rotation of the spindle and collar 178 at more than a predetermined speed causes the weighted arms 179 to fly outward thereby drawing the sleeve 181 to the left and pressing the disk 182 into engagement with the rollers 183. For purposes of adjustment I make the frame 184 pivoted at 185 to the frame plate 21 and at its lower end provide an eye 186 which loosely surrounds a fixed stud 187.

188 is a thumb nut on the stud 187 for pressing a spring 189 against the eye 186. It is evident that the location of the rollers 183 is varied in this way and at the same time these rollers have a yielding action in the engagement of the disk 182.

I have referred to the spindle 45 as though the latter were continuous and unitary throughout its length, and this construction may be employed in some cases, but I prefer to make the outer extremity 192 flexibly clutched at 190 in its engagement with the main body of the spindle 45, in order to avoid binding in the bearings 50 and 191 and to provide a certain rotative back-lash between the parts to assist in starting the mechanism. The governor is also started by a lost motion connection from the spring motor. For this purpose the outer portion 192 of the spindle has splined thereto a flange or collar 193.

194 denotes a pin or hook projecting laterally from the flange 193 and adapted to impinge against a pin 195 on the collar 178 in the normal driving action of the machine. There is a normal looseness or back-lash in this engagement amounting to nearly a quarter of a turn relative movement between the parts. The purpose of the arrangement is to permit the use of a very delicate operating motor. It is evident that if the motor can start up even for a fraction of a turn without any imposed load, that its momentum thereupon becomes sufficient to give the comparatively heavy governor a sudden snap, jerk or kick which insures a prompt and reliable start.

I make use of the flange 193 as a stop motion, and for this purpose I provide a circumferential groove 196. 197 denotes a lever projecting into said groove and pivoted to the frame part 20 at 198, and having a link connection 199 with a rock arm 200 adapted to be forced from one extreme position to the other by a pair of buttons 201. 203 denotes a pin on the flange 193 which is adapted to be projected into the path of a stationary post 204 on the frame of the machine. With this arrangement it will be clear that when the left-hand operating button 201 is depressed, that the splined flange 193 will be slid to the left and its pin 203 projected in the path of the stationary post 204. At the same time, the hook 194 is withdrawn back from the pin 195 of the governor collar. The rotation of the machine is thereby arrested. Conversely when the flange 193 is displaced to the right, it is first disengaged from the post 204 thereupon enabling it to commence its rotation under the influence of the driving motor, and an instant later the hook 194 is brought into engagement with the pin 195 giving the spindle 45 the jerk above mentioned and efficiently and abruptly commencing the rotation of the record medium.

In view of the fact that I have taken up the operation of the various sub-combinations and organisms of the mechanism in describing their construction, it will be only necessary to recapitulate the operation of the machine very briefly. I have shown that the spring motor 22 is wound or put under tension by a pull on the cord 95 and this is accompanied, or more properly is caused by, the displacement of the button 104 to the left in the drawings. Accordingly as long as this button is located at any point to the left of its most right-hand extreme position corresponding to the limit of movement of the sound recorder or reproducer carriage, there will be tension or power enough in the driving motor for the normal operation of the machine. Stated from another standpoint, it is impossible to position the sound recorder or reproducer anywhere on the record medium without by this act imparting sufficient tension to the driving motor to cause the normal actuation of the machine through the entire remainder of the record. The foregoing considerations do not impose any restrictions on free movements of the sound recorder or reproducer back and forth on the record medium, as often as desired, or to any extent desired, or in any direction or manner desired. With the lazy-tongs, which is the normal method of operating the machine, it is automatically insured that the sound recorder or reproducer is lifted off of the record medium before it can be shifted laterally. In the case of actuation by the lever 149, it is correspondingly automatically insured that the collet 111 cannot be released without the lifting of the sound recorder or reproducer at the same time. The movement of the carriage to the right in the drawings can never be had except in the normal operation of the machine, or by releasing the collet 111, so that the record medium can never be scratched by movement of the carriage to the right under any circumstances. The record-medium cannot be scratched under any circumstances by the movement of the carriage to the left when this is done by the lazy-tongs, which is the normal method. The only way therefore, that the scratching of the record medium can occur is by the operator disregarding the lazy-tongs and the lever 149 and pressing directly on the carriage to the left with sufficient force to wind the spring motor 22 in spite of the engagement of the collet 111. This procedure is so unnecessary and unlikely on the part of any operator as to render it not worth while to especially insure against it. However I may arrange a push plate on the front of the carriage having a connection to the slider 130 so as to lift the sound recorder or reproducer whenever the carriage is pressed to the left in any manner.

The various features of the invention may of course be modified without changing their mode of operation or their results. For example, in Fig. 19 I have shown an alternative method of returning the carriage, in place of the lazy-tongs and handle 168. In this case I provide a stationary rack 210 engaged by a pinion 211 pivoted in the carriage and having a hand-crank 212 by which it is rotated. It is clear that the carriage can be returned by rotating the crank 212. In this form of the invention I have shown a vertical governor broadly denoted 213 which is geared from the motor 22 by a simple multiplying gear train 214 as clearly shown. 215 denotes bevel gears by which the vertical spindle of the governor 213 communicates its movement to the horizontal spindle 45 of the record medium.

Having described my invention, I claim:—

1. In a machine for recording or reproducing sound, a record medium, a motor adapted to store up power to rotate said record medium, a recorder or reproducer, and means actuated by a displacement of said recorder or reproducer in one direction for storing power in said motor.

2. In a machine for recording or reproducing sound, a record medium, means adapted to store up power to rotate said record medium, a recorder or reproducer, a part having a movement parallel to that of said recorder or reproducer for storing power in said means, and a releasable grip connection between said recorder or reproducer and said part.

3. In a machine for recording or reproducing sound, a record medium, means adapted to store up power to rotate said record medium, a recorder or reproducer, a part adapted to be displaced for storing up power in said means, and means simultaneously actuated to lower said recorder or reproducer on the record medium and grip said recorder or reproducer to said part.

4. In a machine for recording and reproducing sound, a record medium, a motor adapted to store up power to rotate said record medium, a recorder or reproducer, means actuated by a displacement of said recorder or reproducer in one direction for storing up power in said motor, and means for permitting a free movement of the recorder or reproducer without disturbing said motor.

5. In a machine for recording or reproducing sound, a record medium, means adapted to be energized to rotate said record medium, a recorder or reproducer, a part having a movement parallel to that of the recorder or reproducer for reënergizing said means, and a grip connection between said recorder or reproducer and said part and adapted to be released when the recorder or reproducer is raised away from the record medium.

6. In a machine for recording or reproducing sound, a record medium, means adapted to be tensioned to rotate said record medium, a recorder or reproducer, a part having a movement parallel to that of said recorder or reproducer for reënergizing said means, and a collet grip connection between said sound recorder or reproducer and said part.

7. In a machine for recording or reproducing sound, a record medium, means adapted to be energized to rotate said record medium, a recorder or reproducer, a part having a movement parallel to that of said recorder or reproducer for reënergizing said means, and a collet grip connection between said sound recorder or reproducer and said part adapted to be released when the sound recorder or reproducer is raised away from the record medium.

8. In a machine for recording or reproducing sound, a record medium, means adapted to be energized to rotate said record medium, a recorder or reproducer, a part having a movement parallel to that of said recorder or reproducer for reënergizing said means, and means for engaging and displacing said part by a movement of said recorder or reproducer, said means including an additional releasable grip connection between said recorder or reproducer and said part.

9. In a machine for recording or reproducing sound, a record medium, means adapted to be energized to rotate said record medium, a recorder or reproducer, a part having a movement parallel to that of said recorder or reproducer for reënergizing said means and means for actuating said part by a movement of said recorder or reproducer, said last named means including a releasable grip connection between said recorder or reproducer and said part, said grip connection being substantially inoperative when the recorder or reproducer is raised away from the record medium.

10. In a machine for recording or reproducing sound, a record medium, means adapted to be energized to rotate said record medium, a recorder or reproducer, a part having a movement parallel to that of said recorder or reproducer for reënergizing said means, means for actuating said part by a movement of said recorder or reproducer, and mechanism adapted to be projected against a portion of said last mentioned means to return said recorder and reproducer and displace said part to reënergize said means.

11. In a machine for recording or reproducing sound, a record medium, means adapted to be energized to rotate said record medium, a recorder or reproducer, a part having a movement parallel to that of said recorder or reproducer for reënergizing said means, means for actuating said part by a movement of said recorder or reproducer, mechanism adapted to be projected against a portion of said last mentioned means to return said recorder and reproducer and displace said part to reënergize said means, and means actuated by said mechanism for lifting the sound recorder or reproducer away from the record medium.

12. In a machine for recording or reproducing sound a record medium, means adapted to be energized to rotate said record medium, a recorder or reproducer, a part having a movement parallel to that of said recorder or reproducer for reënergizing said means, a releasable grip connection between said recorder or reproducer and said part, and two separate means for releasing said connection and lifting said recorder or reproducer away from said medium.

13. In a machine for recording or reproducing sound, a record medium, means adapted to be energized to rotate said record medium, a recorder or reproducer, a part having a movement parallel to that of said recorder or reproducer for reënergizing said means, a releasable grip connection between said recorder or reproducer and said part, and means acting to lift said recorder or reproducer away from the record medium, and to release said grip connection.

14. In a machine for recording or reproducing sound, a record medium, means adapted to be energized to rotate said record medium, a recorder or reproducer, a part having a movement parallel to that of said recorder or reproducer for reënergizing said means, a releasable grip connection between said recorder or reproducer and said part, and means for tightening said grip connection and for lowering said recorder or reproducer on the record medium.

15. In a machine for recording or reproducing sound, a record medium, means adapted to be energized to rotate said record medium, a recorder or reproducer, a part having a movement parallel to that of said recorder or reproducer for reënergizing said means, a grip connection between some of said parts, and separate means for simultaneously raising the recorder or reproducer and releasing said grip connection.

16. In a machine for recording or reproducing sound, a record medium, means adapted to be energized to rotate said record medium, a recorder or reproducer, a slider for lifting the recorder or reproducer away from the record medium, mechanism having a pin adapted to be projected behind said slider for the purpose of returning and lifting the recorder or reproducer away from the record medium, a part having a movement parallel to that of the recorder or reproducer for reënergizing said means, and a grip connection between said recorder or reproducer and said part adapted to be released by said mechanism.

17. In a machine for recording or reproducing sound, a record medium, means adapted to be energized to rotate said record medium, a recorder or reproducer, a rod having a movement parallel to that of said recorder or reproducer and adapted to reënergize said means, a collet surrounding said rod, and means for releasing said collet and lifting the recorder or reproducer away from the record medium.

18. In a machine for recording or reproducing sound, a record medium, means adapted to be energized to rotate said record medium, a recorder or reproducer, a rod having a movement parallel to that of said recorder or reproducer and adapted to reënergize said means, a collet surrounding said rod, and a grip-nut having a lever for releasing said collet and lifting the recorder or reproducer away from the record medium.

19. In a machine for recording or reproducing sound, a record medium, means adapted to be energized to rotate said record medium, a recorder or reproducer, an element connected thereto, a cord secured to said means and having a portion extending parallel to the movement of said recorder or reproducer, and a button attached to said cord and adapted to be engaged by said element connected to the recorder or reproducer, said element including a releasable grip connection between said recorder or reproducer and said cord.

20. In a machine for recording or reproducing sound, a record medium, a recorder or reproducer, and a spring motor having a pulley connected to said recorder or reproducer and a gear train connection to said record medium, said motor having a clutch between said pulley and said train.

21. An operating device in which energy may be stored in combination with a record medium and a recorder or reproducer, the said device being adapted to drive said record medium, and means whereby upon the displacement of the recorder or reproducer in a determined direction, power will be stored in the said device for the purpose set forth.

22. In a sound recording or reproducing machine, sound recording or reproducing means, a record medium, mechanism for effecting relative movement between parts of the sound recording and reproducing means and parts of the record medium, said record medium being revoluble at a relatively high speed and said sound recording and reproducing means being movable at a relatively slow speed, said mechanism comprising a power storing device adapted to store sufficient power to drive the machine, and an appliance for storing power in said device actuable substantially in accordance with a displacement of one of the two parts first mentioned in a determined direction with respect to the other, said mechanism further comprising elements coöperating with each other to expend a part of the stored power in moving the said parts in manner aforesaid.

23. An operating device in which energy may be stored in combination with a movable record medium and a movable recorder or reproducer, the said device being adapted to drive both said record medium and said recorder or reproducer, and means whereby upon the displacement of one of the movable parts aforesaid in a determined direction with respect to the other of said parts, power will be stored in the said device for the purpose set forth.

In witness whereof, I subscribe my signature, in the presence of two witnesses.

JOHN H. J. HAINES.

Witnesses:
　WALDO M. CHAPIN,
　WILLIAM C. LARY.

Copies of this patent may be obtained for five cents each, by addressing the "Commissioner of Patents, Washington, D. C."